United States Patent
Cain et al.

(10) Patent No.: US 6,574,994 B2
(45) Date of Patent: Jun. 10, 2003

(54) METHOD OF MANUFACTURING MULTI-SEGMENTED OPTICAL FIBER AND PREFORM

(75) Inventors: Michael B. Cain, Corning, NY (US); Liam R. dePaor, Corning, NY (US); Robert B. Desorcie, Painted Post, NY (US); Richard M. Fiacco, Corning, NY (US); Cynthia B. Giroux, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/883,630

(22) Filed: Jun. 18, 2001

(65) Prior Publication Data

US 2002/0189296 A1 Dec. 19, 2002

(51) Int. Cl.⁷ ............................................. C03B 37/018
(52) U.S. Cl. .................. 65/391; 65/413; 65/414; 65/415; 65/416; 65/417; 65/419; 65/421; 65/428; 65/435; 65/412; 65/397; 65/398
(58) Field of Search ................. 65/412, 413, 414, 65/415, 416, 417, 419, 421, 428, 435, 391, 397, 398

(56) References Cited

U.S. PATENT DOCUMENTS

| | | | |
|---|---|---|---|
| 3,933,454 A | 1/1976 | DeLuca .............................. 65/3 |
| 3,963,468 A | 6/1976 | Jaeger et al. ...................... 65/3 |
| 4,195,980 A | 4/1980 | Sterling et al. .................... 65/3 |
| 4,203,743 A | 5/1980 | Suganuma et al. ............... 65/3 |
| 4,206,968 A | 6/1980 | Suganuma et al. ....... 350/96.33 |
| 4,264,347 A | 4/1981 | Shitani et al. ..................... 65/3 |
| RE30,635 E | * 6/1981 | Kuppers et al. ......... 350/96.31 |
| 4,402,720 A | 9/1983 | Edahiro et al. ............... 65/3.12 |
| 4,528,009 A | 7/1985 | Sarkar ......................... 65/3.12 |
| 4,557,561 A | * 12/1985 | Schneider et al. ............. 65/3.2 |
| 4,629,485 A | 12/1986 | Berkey ........................ 65/3.11 |
| 4,643,751 A | 2/1987 | Abe ............................. 65/3.12 |
| 4,648,891 A | 3/1987 | Abe ............................. 65/3.12 |
| 4,668,263 A | 5/1987 | Yokota et al. ............... 65/3.11 |

(List continued on next page.)

FOREIGN PATENT DOCUMENTS

| | | | |
|---|---|---|---|
| GB | 0 915 064 | 5/1999 | ......... C03B/37/012 |
| WO | WO 00/26150 | 5/2000 | ......... C03B/37/012 |
| WO | WO 00/67053 | 11/2000 | ............ G02B/6/16 |

*Primary Examiner*—James Derrington
(74) *Attorney, Agent, or Firm*—Randall S. Wayland

(57) ABSTRACT

A method for manufacturing optical fiber preform and fiber. According to the method, a core cane segment is formed with a refractive index delta preferably between 0.2% and 3% that is most preferably formed by an OVD method. A sleeve is formed including at least one down-doped moat preferably having a refractive index delta between −0.1% and −1.2% and at least one up-doped ring preferably having a refractive index delta between 0.1% and 1.2%. The sleeve is formed by introducing glass precursor and dopant compounds into a cavity of a preferably silica glass tube (e.g., one of an MCVD and PCVD method). The core cane segment is inserted into the sleeve and the sleeve is collapsed onto the core cane segment to form a core-sleeve assembly. The core-sleeve assembly is again drawn into a cane and additional cladding is preferably formed thereon. Optical fiber may be drawn from the preform in a conventional draw apparatus. According to another embodiment, the method of manufacturing a multi-segment optical fiber preform comprising the steps of forming a core cane including a first up-doped portion and a down-doped portion, forming a sleeve on an inside of a tube including a second up-doped portion, inserting the core cane into the sleeve, and collapsing the sleeve around the core cane to form a cane-sleeve assembly.

26 Claims, 18 Drawing Sheets

U.S. PATENT DOCUMENTS

| | | | |
|---|---|---|---|
| 4,714,589 A | 12/1987 | Auwerda et al. | 427/39 |
| 4,734,117 A | 3/1988 | Pilon et al. | 65/3.12 |
| 4,737,179 A | 4/1988 | Tanaka et al. | 65/3.12 |
| 4,749,396 A | 6/1988 | Hicks, Jr. | 65/3.12 |
| 4,793,842 A | 12/1988 | Yokota et al. | 65/3.11 |
| 4,846,867 A | 7/1989 | Yokota et al. | 65/3.12 |
| 4,877,938 A | 10/1989 | Rau et al. | 219/121.59 |
| 5,000,773 A | 3/1991 | Le Noane et al. | 65/3.12 |
| 5,033,815 A | 7/1991 | Edahiro et al. | 350/96.34 |
| 5,059,230 A | 10/1991 | Mollenauer et al. | 65/3.11 |
| 5,106,402 A | 4/1992 | Geittner et al. | 65/3.12 |
| 5,127,929 A * | 7/1992 | Gunther et al. | 65/DIG. 16 |
| 5,149,349 A | 9/1992 | Berkey et al. | 65/3.11 |
| 5,152,818 A | 10/1992 | Berkey et al. | 65/3.11 |
| 5,917,109 A | 6/1999 | Berkey | 65/412 |
| 6,105,396 A * | 8/2000 | Glodis et al. | 65/412 |
| 6,154,594 A | 11/2000 | Fiacco et al. | 385/126 |
| 6,173,588 B1 | 1/2001 | Berkey et al. | 65/407 |
| 6,189,342 B1 * | 2/2001 | Berkey | 65/412 |

* cited by examiner

FIG. 14a
FIG. 14b
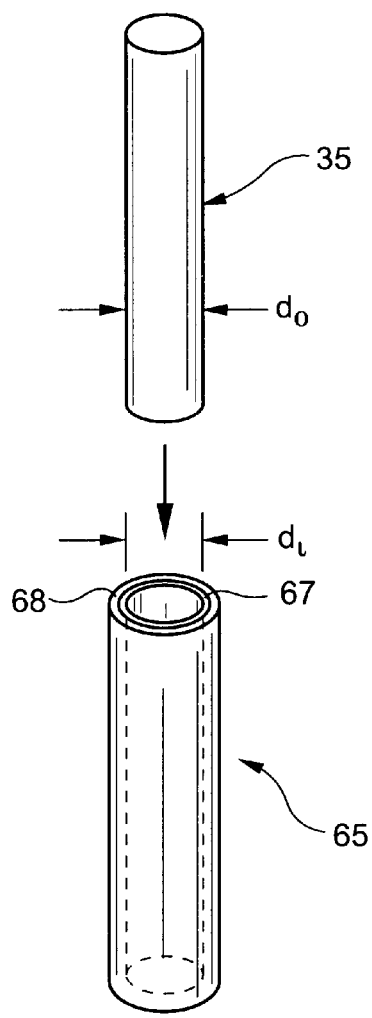
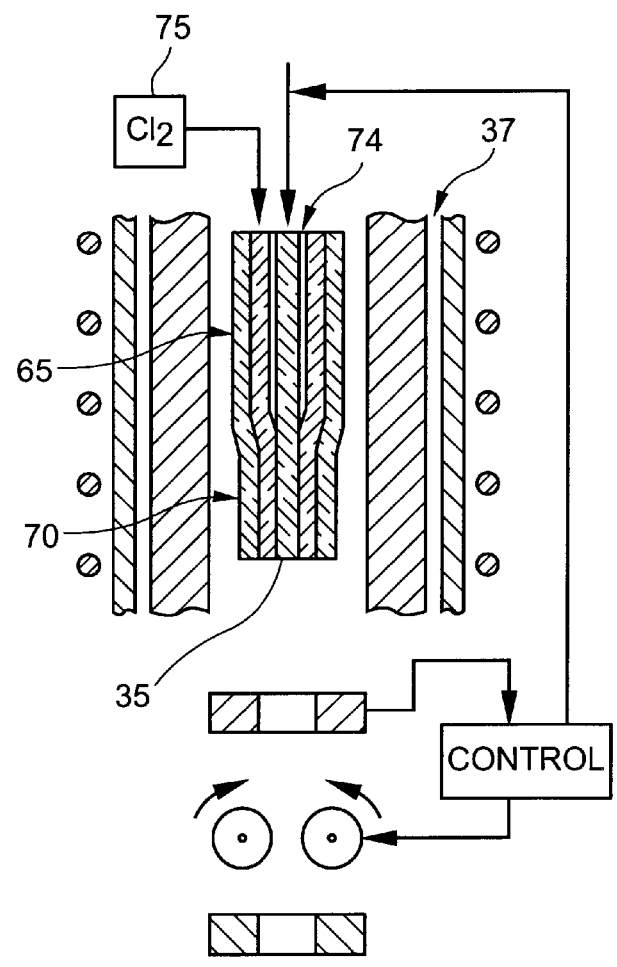

US 6,574,994 B2

METHOD OF MANUFACTURING MULTI-SEGMENTED OPTICAL FIBER AND PREFORM

TECHNICAL FIELD

This invention relates to a method for producing an optical fiber preform and fiber. More specifically, the method relates to efficiently producing optical fiber preforms and fibers having multiple segments therein.

BACKGROUND OF THE INVENTION

Manufacturing of optical fiber preforms, i.e., the article from which optical fiber is drawn, is typically accomplished by methods such as Outside Vapor Deposition (OVD), Vapor Axial Deposition (VAD), Modified Chemical Vapor Deposition (MCVD) and Plasma Chemical Vapor Deposition (PCVD). In accordance with one method, a multi-segment profile in the preform (corresponding to a multi-segment profile in the optical fiber drawn therefrom) is formed by an OVD method. In the OVD method, silica-containing soot 22 is deposited onto a rotating and traversing mandrel 24 as indicated by arrows A and A' of FIG. 2 to form a porous core soot preform 20. To form the soot 22, a glass precursor 28 is provided, preferably in gaseous form, to the flame 30 of a burner 26. The flame 30 is formed by combusting a fuel 32, such as methane, while providing a combustion supporting gas, such as oxygen 34. The core soot preform 20 may be up-doped with a dopant such as germania oxide, for example, to raise its refractive index. This may be accomplished, for example, by providing a glass precursor 28, such as $SiCl_4$, to the burner 26 in gaseous form along with a gaseous dopant compound, such as $GeCl_4$. The doped silica-containing soot preform 20 is then dried and consolidated in a consolidation furnace 29, such as shown in Prior Art FIGS. 3 and 4 to form a consolidated core blank 31. A helium and chlorine gas atmosphere, for example, in the consolidation furnace is used to dry the preform and remove water prior to vitrification into glass at a temperature of about 950° C. to 1250° C. Pure helium is generally provided during consolidation and the temperature is higher, for example, between about 1390° C. to 1535° C.

Following consolidation, next, as shown in FIG. 5, the consolidated core blank 31 is placed in a cane draw furnace 37 and is stretched into a length of core cane 33 from which multiple core cane segments 35 are derived. At the same time, the centerline aperture is closed by application of, for example, a vacuum. The draw tension and preform down-feed rates (indicated by arrow B) are controlled by suitable control method 38 to provide a core cane length 33 of preferably substantially constant, predetermined diameter $d_o$. The diameter $d_o$ is controlled by feedback of a measured diameter signal from an appropriate non-contact sensor 39 to the control apparatus 38. In response, the controls 38 may adjust the tension applied at the tension apparatus 40 whereby lowering the tension raises the diameter $d_o$ and raising it lowers the diameter $d_o$. At predetermined lengths, the cane is cut, such as by a flame cutter 42, to form a predetermined length core cane segment 35 (FIG. 6). This core cane 35 represents the first segment 44 of the final preform, as illustrated in FIG. 1.

The second preform segment 45, which is a down-doped moat, is formed by depositing on the core cane segment 35 additional silica-containing soot. This step looks identical to FIG. 2 except that the mandrel is now the previously made core cane 35. The soot deposited is preferably silica soot formed by providing the glass precursor 28 such as $SiCl_4$ to the flame 30 and oxidizing the precursor to form $SiO_2$. Next, the soot-laden core cane 41 is placed in a furnace 29 as is described in Berkey U.S. Pat. No. 4,629,485 and the soot, after being dried, is subjected to a fluorine-containing atmosphere. This dopes the soot with fluorine. Subsequently, the doped-soot preform 41 is consolidated, as shown in FIG. 7. Again, the resultant consolidated preform (now containing two core segments) is drawn into a core cane as is shown in FIG. 5. The only difference is that the consolidated preform now includes a core at its centerline, rather than a centerline aperture as shown in FIG. 5.

To make the third up-doped segment 46 (FIG. 1), the process of FIG. 2 is again repeated where a glass precursor 28 is provided to the flame 30. A desired amount of dopant compound, such as $GeCl_4$, is also provided to achieve the profile preferably as shown in the third segment 46 of FIG. 1. This is accomplished by gradually turning on the supply of dopant compound 36 at the innermost part of the segment and gradually turning it off towards the outermost portion of the segment 46 by controlling the mass flow controllers V. Once the additional soot segment is formed, it is again dried and consolidated as shown in FIG. 7. Once consolidated, it is again drawn into a core cane segment as described with reference to FIG. 5. As should be recognized, the core cane 10 segment now contains three segments 44, 45 and 46 therewithin.

In the final step, the core cane segment is overclad with silica-containing soot by the method shown in FIG. 2 wherein the cladding preferably comprises essentially $SiO_2$. Again, the soot preform is dried and consolidated as heretofore mentioned to form a fourth segment 48 and to form the final consolidated optical fiber preform. The resulting final consolidated preform 50 is then placed in a draw furnace 52 as shown in FIG. 8, heated and drawn into an optical fiber 54 in a helium gas atmosphere by conventional methods and apparatus. The fiber 54 is then cooled in cooling chamber 55 and measured for final diameter by non-contact sensor 56. One or more coatings are applied and cured by coating apparatus 58, as is also conventional. During draw, the fiber 54 passes through a tension assembly 60 whereby tension is applied to draw the fiber 54 from the preform 50. The tension is controlled via control apparatus 61 to maintain the fiber diameter at a predetermined set point. Finally, the coated fiber 54 is wound by feedhead 62 onto a fiber winding spool 64.

It should be readily apparent that the prior art, multi-step, OVD process is complex, and therefore time intensive. Moreover, because of the multiple steps involved to arrive at the final optical fiber preform, it is sometimes difficult to achieve consistent profiles. Further, it is also possible to experience high levels of scrap.

Thus, it should be apparent that there is a long felt and unmet need to produce optical fiber preforms cost effectively, efficiently and with greater control of the optical parameters and index profiles.

BRIEF SUMMARY OF THE INVENTION

The manufacturing method in accordance with a first embodiment of the invention provides a multi-segment preform that may be produced in a highly efficient manner with improved profile predictability and possibly lessened scrap. The method of manufacturing a multi-segment optical fiber preform, comprises the steps of forming a core cane segment, which preferably has a germania dopant therein, providing a delta of between about 0.2%–3%, inserting the segment into a sleeve formed by and inside method such as MCVD or PCVD and then collapsing the sleeve onto the cane. Other suitable inside methods may alternatively be employed. Fiber may then be drawn therefrom by conventional methods. The result is a detailed refractive index profile that can be readily made with fewer steps than the prior art method.

In particular, it has been found that the ring shape can be manufactured advantageously with a great amount of precision and, in particular, latent rings (rings that are positioned some finite distance away from the outer edge of the moat) may be manufactured very precisely. Further, the refractive index profile may be made with better repeatability and possibly with a lesser amount of scrap. Advantageously, new refractive index profiles may be made in accordance with the present method whereby heretofore using prior art methods, glass crizzling at the segment interfaces has occurred. The core cane, in accordance with the invention is preferably formed by an OVD method wherein a core soot region is formed by depositing silica-containing soot onto an outside of a rotating deposition surface, the core soot region is then dried and consolidated in a consolidation furnace to form a consolidated core blank, followed by drawing from the consolidated core blank the core cane segment having an outer dimension $d_o$.

In accordance with the invention, the sleeve is formed by an IVD method, such as an MCVD or, more preferably, a PCVD process. The core cane segment is inserted into the sleeve, preferably purged with a purge gas, and the sleeve is collapsed thereon to form a core-sleeve assembly. The sleeve is preferably manufactured by forming doped-silica glass deposited onto the inside of a silica-containing glass tube by supplying glass precursor together with a dopant compound to the tube's cavity. The sleeve is doped such that it preferably includes a down-doped inner radial segment preferably with a delta between −0.1% and −1.2% and an outer up-doped radial segment preferably with a delta between 0.1% and 1.2%, both preferably measured as compared to pure silica. However, it should be recognized that the tube may also include a refractive index altering dopant, such as fluorine. Most preferably, the down-doped radial portion comprises fluorine and is located on an inner portion of the sleeve. The up-doped portion comprises germania and is located at an outer portion of the sleeve (located radially outward from the inner portion).

In accordance with another embodiment of the invention, silica-containing cladding is then provided after stretching the core-sleeve assembly to form a multi-segment core cane. The cladding may be formed by OVD process or by a cladding tube that is inserted over and collapsed onto the multi-segment cane. The resultant multi-segment preform is formed by consolidating the cladding soot or collapsing the cladding tube onto the core cane. From this, optical fiber including many complex up-doped and down-doped refractive index profiles may be manufactured.

The invention herein results in a method whereby better controls on the individual segments are provided because each may be individually controlled for dimensional characteristics and refractive index characteristics thereby better controlling mode field diameter, effective area, dispersion, and attenuation. Further, the numbers of process steps are significantly reduced. Additionally, the amount of scrap may be reduced because out of tolerance segments may be individually screened and scrapped and, therefore, not be incorporated into the final product. This further enhances the capability of closely and precisely achieving a particular target profile. Further, it is believed that the centerline dip (a dip in the refractive index profile at the center of the core) experienced by preforms made by the prior art method may be reduced by the present invention. Additionally, it is believed that better control of the depth of the fluorine moat may be accomplished by the invention. Moreover, because of the lesser number of manufacturing steps, the number of glass/soot interfaces is reduced, thereby reducing the attenuation increases associated with such interfaces.

In accordance with another embodiment of the invention, a method of manufacturing a multi-segment optical fiber is provided comprising the steps of forming a core soot preform by depositing silica-containing soot onto an outside of a rotating deposition surface, consolidating the core soot preform in a consolidation furnace thereby forming a consolidated core blank, drawing from the consolidated core blank to form at least one core cane segment having an outer dimension $d_o$; forming a sleeve on an inside of a tube wherein the sleeve includes one or more down-doped radial portions and one or more up-doped radial portions, preferably as compared to silica, inserting the core cane segment into the sleeve, collapsing the sleeve around the core cane segment to form a core-sleeve assembly, drawing the core-sleeve assembly forming a multi-segmented core cane, cladding on an outside of the core-cane to form an optical fiber preform, and drawing the optical fiber from the optical fiber preform. It should be recognized that the one or more down-doped portions may include a moat and a gutter, for example. Further, the one or more up-doped portions may include multiple spaced rings.

According to another embodiment of the invention, a method of manufacturing a multi-segment optical fiber preform is provided. The method comprises the steps of forming a core cane including a first up-doped portion and a down-doped portion by an OVD process, forming a sleeve including a second up-doped portion by one of a MCVD and PCVD process, inserting the core cane into the sleeve, and collapsing the sleeve around the core cane to form a cane-sleeve assembly.

According to another embodiment, the method of manufacturing a multi-segment optical fiber preform comprising the steps of forming a core cane including a first up-doped portion and a down-doped portion, forming a sleeve on an inside of a tube including a second up-doped portion, inserting the core cane into the sleeve, and collapsing the sleeve around the core cane to form a cane-sleeve assembly.

Preferably, the aforementioned cane-sleeve assemblies are drawn into at least one core cane and additional cladding is formed on the outside of a segment thereof. The cladding may include deposited soot that is subsequently consolidated, or a cladding tube inserted over, and collapsed onto the multi-segment core cane. Fiber may then be draw from the assembly.

Other features and details of the present invention will be apparent from the appended specification, claims and drawings.

BRIEF DESCRIPTION OF THE FIGURES

FIG. 14a illustrates a perspective view of a process of assembly of the core cane into the sleeve in accordance with the present invention.

FIG. 14b illustrates a perspective view of a process of purging the gap between the cane and sleeve and the step of collapsing in accordance with the present invention.

DETAILED DESCRIPTION OF THE INVENTION

Figure 1:
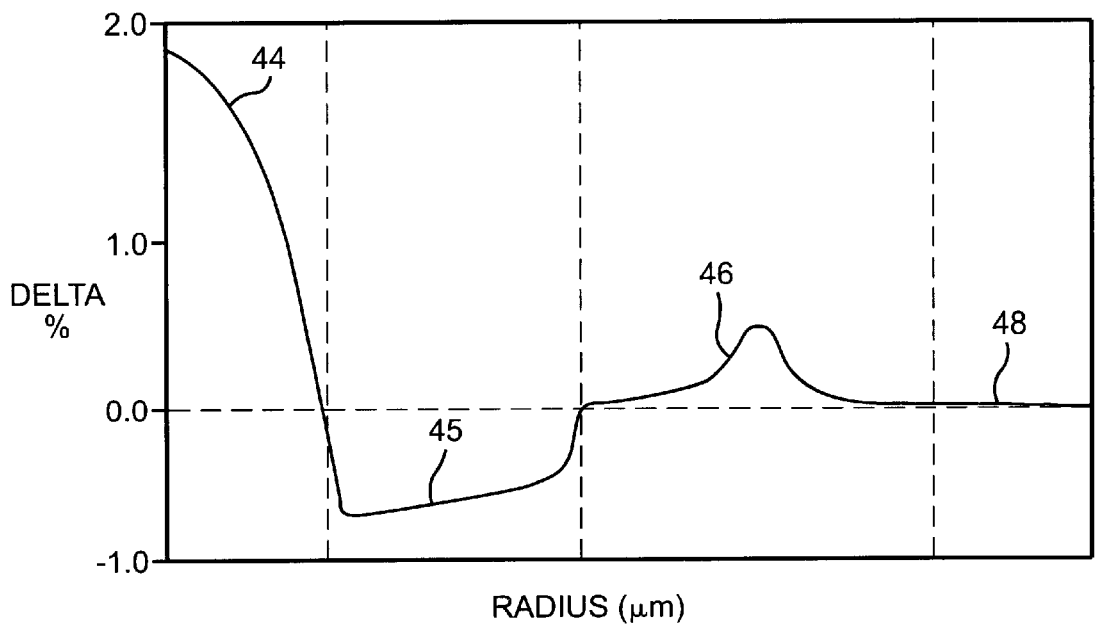
FIG. 1 illustrates a schematic depiction of a four-segment profile in accordance with the prior art.
Figure 2:
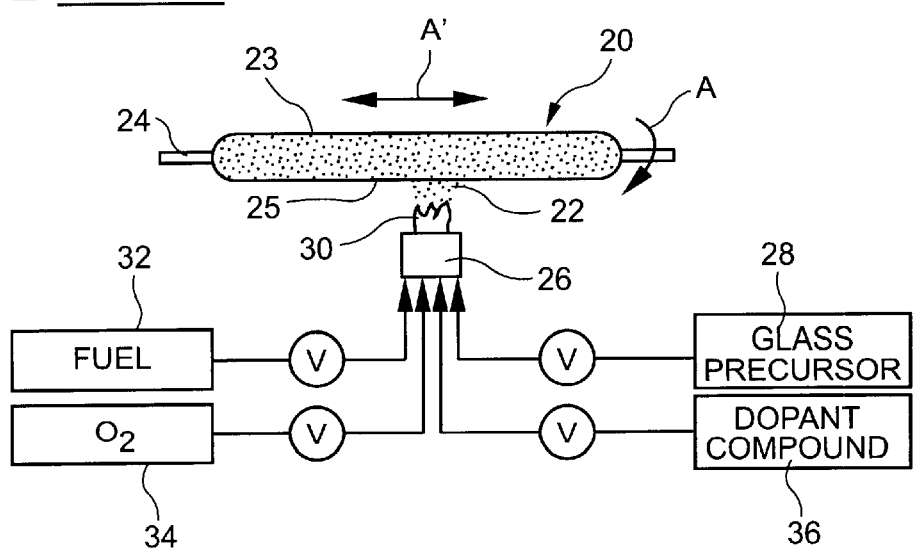
FIG. 2 illustrates a prior art OVD method for forming a soot preform.

Reference will now be made in detail to the present preferred embodiments of the invention with reference to the attached drawings. Wherever possible, the same or similar reference numerals shall be used throughout to refer to the same or like parts.

According to a first embodiment of the present invention, a method of manufacturing a multi-segment optical fiber preform 20 is provided. As best illustrated in FIGS. 2–5, the method for forming the multi-segment optical fiber preform comprises a first the step forming at least one core cane segment 35 having an outer dimension $d_o$. The core cane is preferably formed in accordance with the prior art OVD method described herein. In particular, a core soot region 23 is formed by depositing doped silica-containing soot 22 onto an outside of a relatively rotating and translating deposition surface 25. At first, the surface is a tapered mandrel and thereafter is the surface of the soot already deposited. The soot 22 is formed by providing a glass precursor 28 in gaseous form to the flame 30 of a burner 26 to oxidize it. Fuel, such as methane ($CH_4$), and combustion supporting gas 34, such as oxygen, are provided to the burner 26 and ignited to form the flame 30. Mass flow controllers, labeled V, meter the appropriate amounts of suitable dopant compound 36, glass precursor 28, fuel 32 and combustion supporting gas 34, all preferably in gaseous form, to the burner 26. The glass former compounds 28, 36 are oxidized in the flame 30 to form the generally cylindrically-shaped soot region 23. In particular, it is desirable that the dopant compound 36 includes an index raising dopant, such as a germanium compound, so that the up-doped profile segment 144 of the refractive index profile of FIG. 9 may be achieved.

Figure 3:
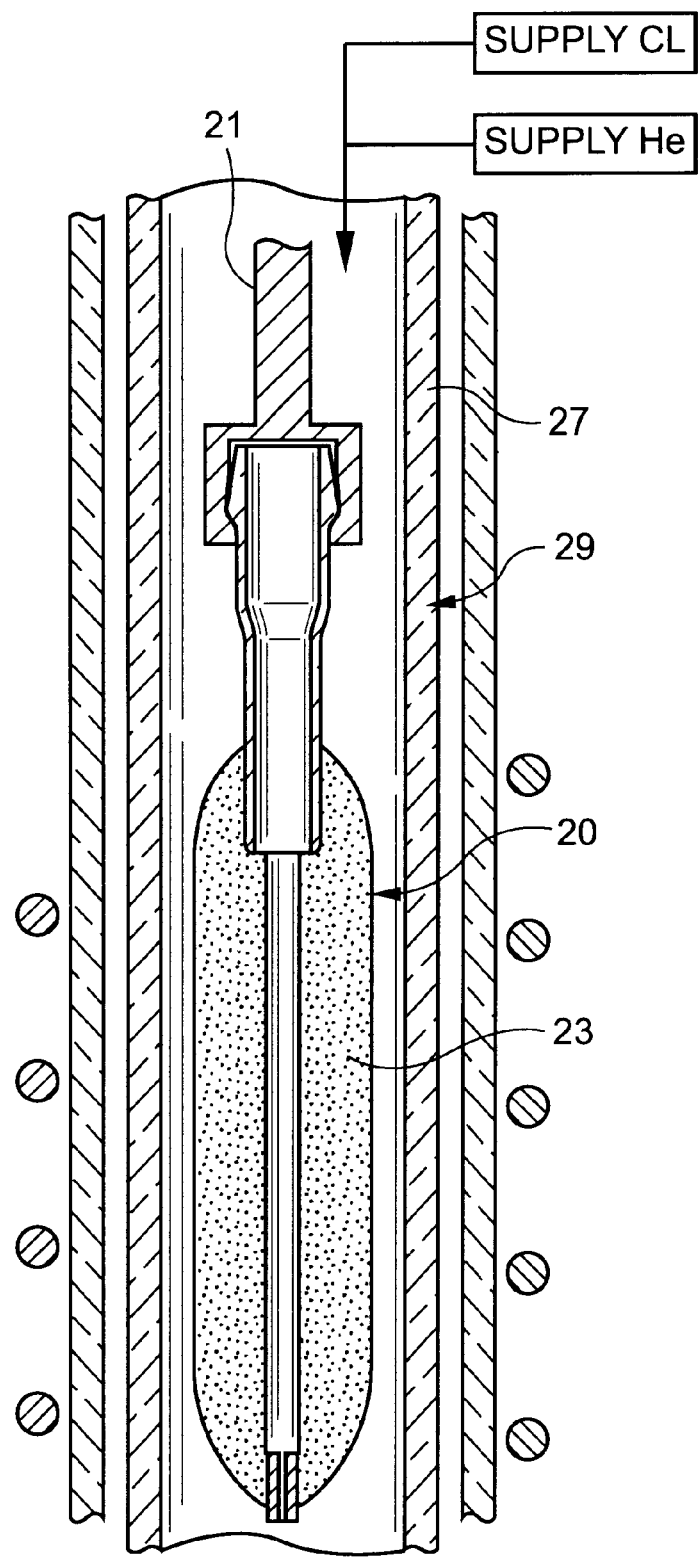
FIGS. 3 and 4 illustrates partially cross-sectioned side views of a soot preform and a consolidated core blank in accordance with the prior art.
Figure 4:
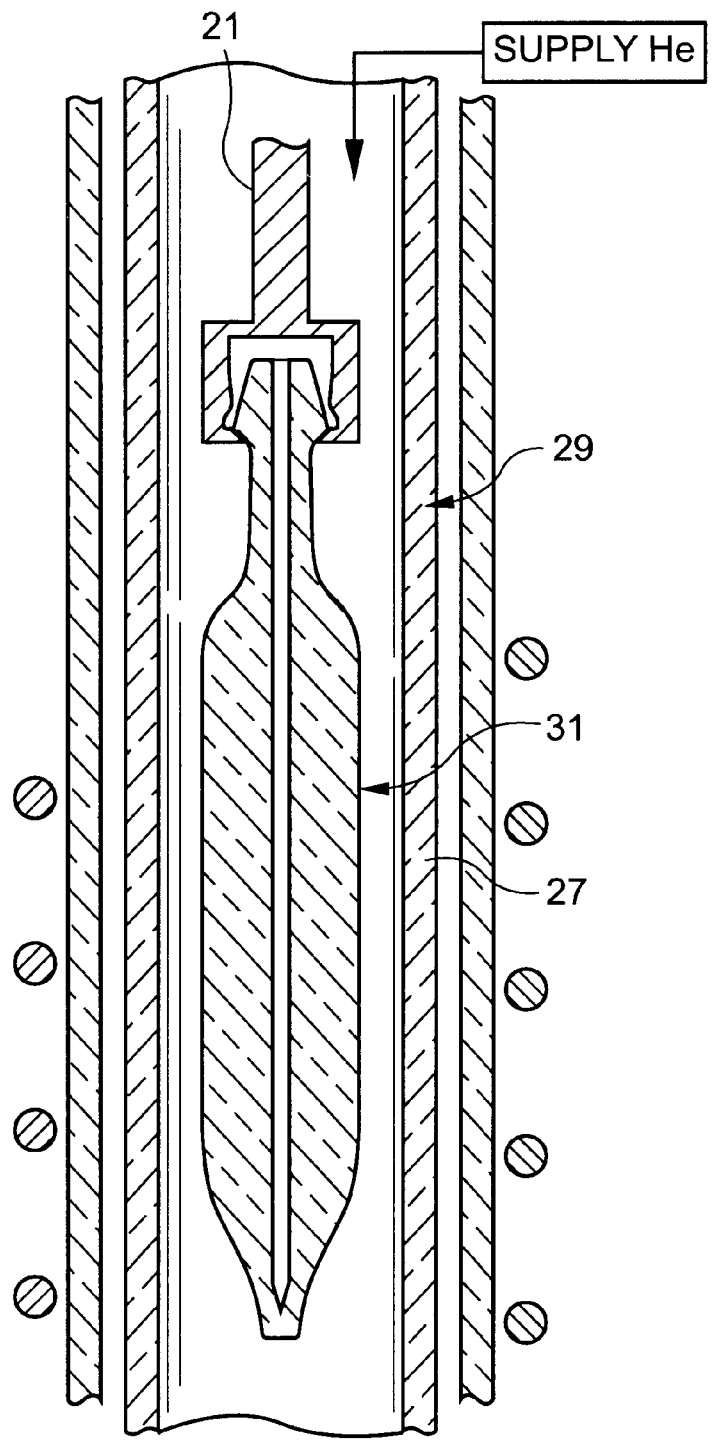

Next, the soot preform 20 including the soot region 23 is consolidated in a consolidation furnace 29 thereby forming a consolidated core blank 31 as is shown in FIGS. 3 and 4. The soot preform 20 is suspended inside a pure quartz muffle tube 27 of the furnace 29 by a holding mechanism 21 and exposed to a drying atmosphere of about 98% to 99% helium and 1% to 2% % chlorine gas at a temperature of between about 950° C. and 1250° C. for between about 0.5 and 4.0 hours. The furnace temperature is then raised and the preform 20 is consolidated preferably in an atmosphere of pure helium at a temperature of between about 1390° C. and 1535° C. to form the consolidated core blank 31. Preferably, gradient sintering is employed whereby the soot preform 20 is driven down through a hot zone of the furnace 29 at a rate of about 2–20 mm/minute.

Figure 5:
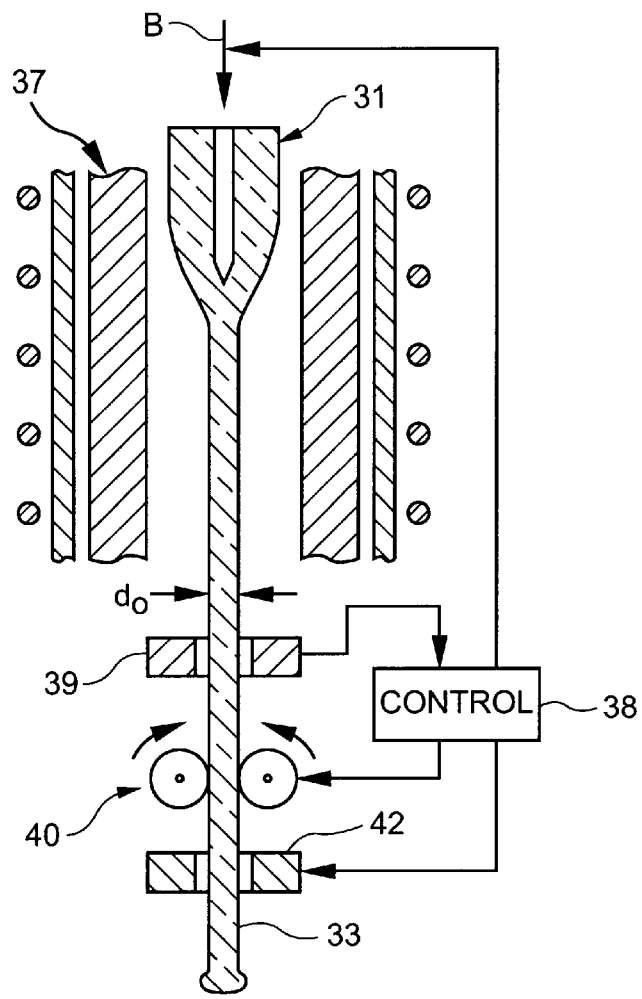
FIG. 5 illustrates a partially cross-sectioned side view of a core cane draw furnace in accordance with the prior art.
Figure 6:
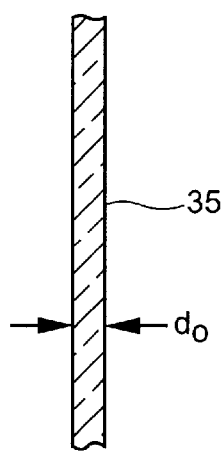
FIG. 6 illustrates a cross-sectioned side view of a core cane segment in accordance with the prior art.

As illustrated in FIGS. 5 and 6, the consolidated core blank 31 is next placed in a core cane draw furnace 37 and at least one rod-shaped core cane segment 35 (FIG. 6) having an outer dimension $d_o$ is drawn therefrom. The preform blank 31 is heated to a temperature between about 1700° C. and 2000° C. until a gob drops. Once a suitable amount of trash glass is stripped, the controls 38 then control the tension applied to the cane by suitable control signals to a tension mechanism 40, shown here as two tractor wheels, to draw down the cane 33 at the proper speed. In this way, it is possible to derive a length of core cane 33 having an outer diameter dimension of between about 1 mm and 8 mm.

Figure 9:
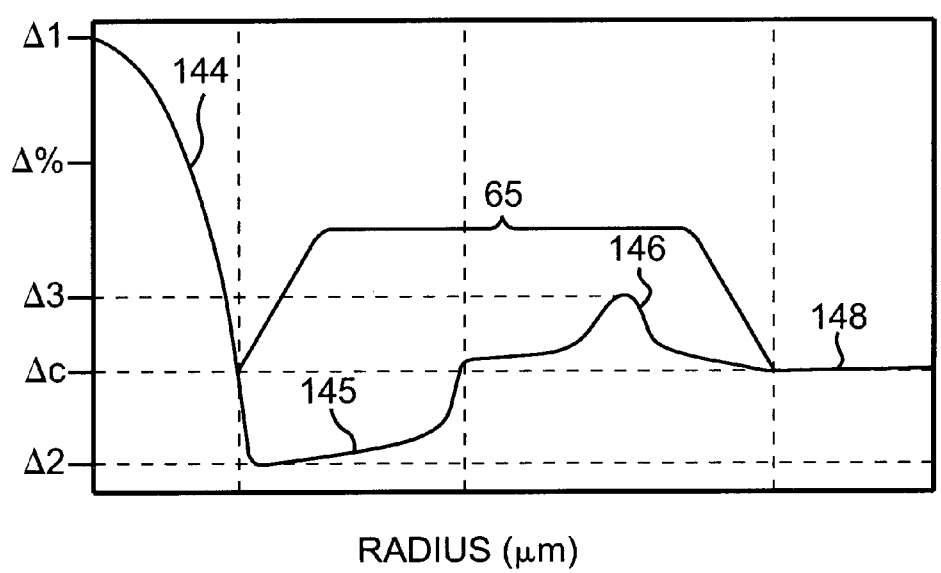
FIG. 9 illustrates a refractive index profile plot of a multi-segmented fiber in accordance with the present invention.

The diameter is monitored by a non-contact sensor 39 and provides to the control system 38 a signal thereof. The controls 38 compare the sensed diameter signal from sensor 39 to a predetermined set diameter stored in memory and thereafter commands an appropriate adjustment, if any, to the tension to maintain the set diameter $d_o$. Controls 38 also control the down feed rate of the blank 31. Preferably, that rate is held constant. Arrow B indicates the down feed of the blank 31. As a predetermined length of the core cane 33 passes through the tension assembly 40, as determined by the controls, a cutter 42, such as a flame cutter, is activated. The cutter severs the cane 33 into predefined lengths of core cane segments 35 (FIG. 6). It should be recognized that the core cane 35 produced corresponds to the innermost core of the preform and fiber and preferably includes the germania dopant to enable achieving the desired refractive index profile segment 144 (FIG. 9). In a preferred embodiment, the core cane segment 35 has a $\Delta 1$ of between 0.2% and 3% as compared to the silica cladding, where $\Delta c=0$ and $\Delta 1=(n1-nc)/nc$, where n1 is the refractive index of the first segment 144, and nc is the refractive index of the cladding 148.

Figure 11:
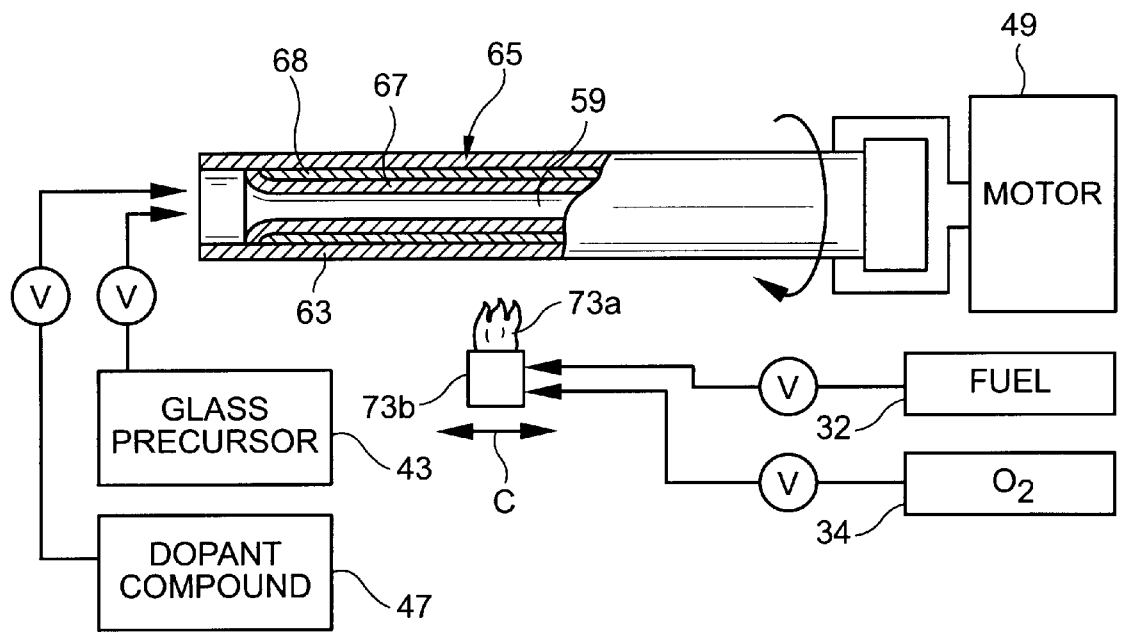
FIG. 11 illustrates a partially cross-sectioned side view of an MCVD assembly for producing the sleeve in accordance with an embodiment of the present invention.
Figure 12:
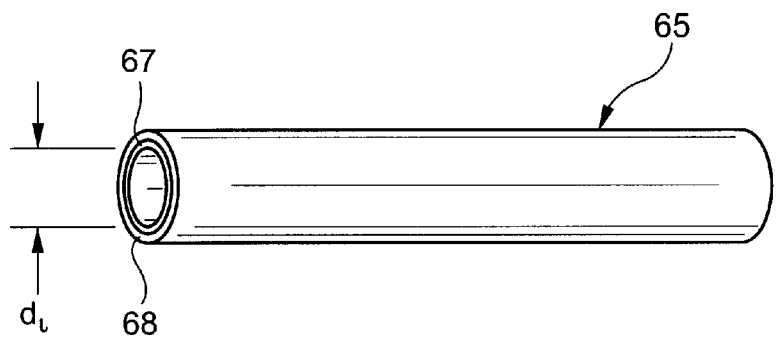
FIG. 12 illustrates a perspective view of a sleeve in accordance with the present invention.
Figure 13:
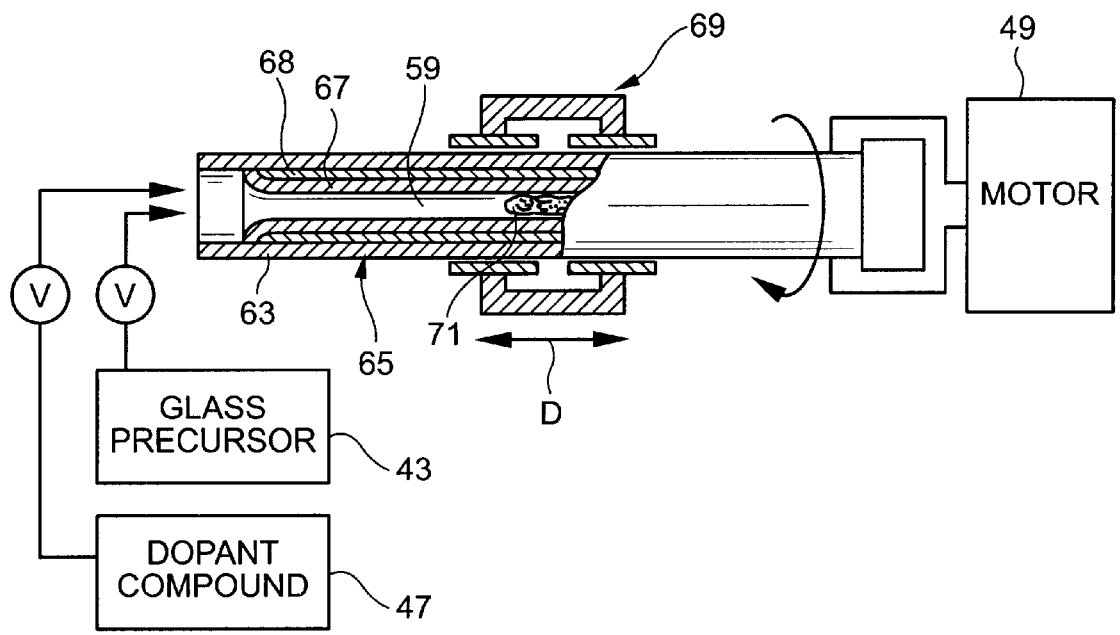
FIG. 13 illustrates a partially cross-sectioned side view of a PCVD assembly for producing the sleeve in accordance with another embodiment of the present invention.

The next step in the method in accordance with the invention, as best illustrated in FIGS. 11 through 13, is forming a sleeve 65 on an inside of a preferably pure quartz glass tube 63. The sleeve 65 preferably includes a down-doped inner radial portion 67, as compared to silica, formed at an inner portion of the sleeve, and a outer radial up-doped portion 68, as compared to silica, formed at an outer portion of the sleeve 65. In the FIG. 11 embodiment, the sleeve 65 is formed by introducing gaseous glass precursor, such as $SiCl_4$ and, preferably, a dopant compound into the end and inside cavity of the glass tube 63. The glass precursor 43 and dopant compound 47 are provided in gaseous form to dope the glass to achieve the desired refractive index profile for the sleeve 65 as a function of radial dimension thereof.

In particular, the up-doped segment 68 is preferably formed by providing a index-raising dopant compound 47, such as a germanium-containing dopant compound, in gaseous form into the cavity of the tube 63 along with the glass precursor 43. One preferred compound is $GeCl_4$. Others include $Cl_2$, $POCl_5$, $TiCl_4$, $AlCl_3$ or any other suitable index-raising dopant. Preferably, the up-doped segment 67, i.e., the ring, is provided wherein the $\Delta 3$ (FIG. 9) is between about 0.1% and about 1.2%.

The down-doped segment 67 is next formed by introducing an index-lowering dopant compound 47, such as $F_2$, $CF_4$, $C_2F_4$, $SF_6$, $SiF_4$, $C_2F_6$ or any other suitable fluorine-containing compound in gaseous form into the inner cavity of the tube 63. As the glass precursor 43 (e.g. $SiCl_4$) and dopant compound 47 are introduced into the silica-containing tube 63, the tube is rotated by a motor 49 at rotational speed of between about 20 and 60 rpm. Soot is formed in the tube and by the aid of an axially traversing flame 73a of a burner 73b that moves along the length of the tube 63 (as indicated by arrow C), the soot is heated and substantially simultaneously converted into consolidated glass on the inside of the tube. The burner 73b operates on any suitable fuel 32, such as $CH_4$, and suitable combustion supporting gas 34, such as $O_2$. Other gases may be included such as $C_2H_2$, $H_2$, and/or $N_2$. Preferably, the sleeve 65 has the refractive index profile as indicated in FIG. 9 thereby providing at least one up-doped segment 146 and at least one down-doped segment 145, as shown. Preferably, the down-doped segment of the sleeve 65 is achieved by including a fluorine dopant. In particular, it is desired that down-doped moat segment include a $\Delta 2$ between about $-0.1\%$ and $-1.2\%$. Once the sleeve 65 is formed inside of the tube, the sleeve 65 remains as part of the sleeve and additional silica-containing glass or soot is added thereon to form the cladding.

Alternatively, the sleeve 65 of FIG. 12 may be produced by a Plasma Chemical Vapor Deposition (PCVD) method, as shown in FIG. 13. In the PCVD method, a glass precursor 43 and dopant compound 47 are provided into the cavity of the silica glass tube 63 in gaseous form as in the before-mentioned MCVD process of FIG. 11. However, in this case, the cavity of the silica tube 63 is held at a low pressure (typically 10–20 Torr) and energy is provided by a microwave resonator 69 (typically powered by 2–6 kW). The microwave resonator 69 surrounds the tube 63, and directs microwaves through the wall of the tube 63 to produce plasma 71 within the tube 63. The microwaves heat the inside of the tube 63 and the gases to about 1200° C.–1400° C., thus promoting chemical reactions, and causing the formation of consolidated glass inside of the tube 63. PCVD apparatus are taught in U.S. Pat. No. 4,877,938 and U.S. Pat. No. 4,714,589, for example. The dopants introduced are provided in such amounts as to provide at least one up-doped and at least one down-doped segment, as shown in FIG. 9. Similar to the MCVD process, any suitable motor 49 rotates the tube 63 and any suitable traverse assembly (not shown) moves the generator 69 back and forth (as indicated by arrow D) along the length of the tube 63.

Figure 10:
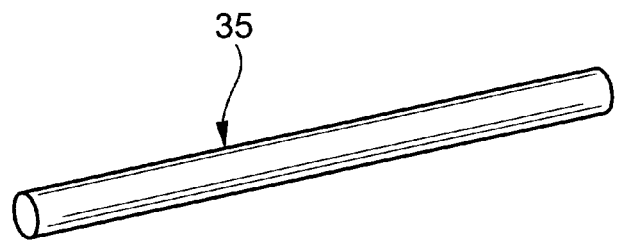
FIG. 10 illustrates a perspective view of a core cane segment in accordance with the present invention.

In accordance with the next step in the method invention, the core cane segment 35 of FIG. 10 having a dimension $d_o$ of between about 1 mm and 8 mm is inserted into the sleeve 65, as is illustrated in FIG. 14a. The sleeve 65 includes portions 67 and 68 and has an inner dimension of between about 17 mm and 26 mm. Prior to the step of inserting, the sleeve 65 preferably undergoes a step of shrinking to have an inner dimension $d_i$ larger than the outer dimension $d_o$ by between about 0.5 mm and 2.0 mm. The shrinking may be accomplished in a lathe (not shown) or a furnace (not shown) by applying uniform heat along the sleeve's length thereby uniformly shrinking the inner dimension of the sleeve 65 to the desired dimension $d_i$.

In the next step of the present method, as best shown in FIG. 14b, the sleeve 65 and core cane 35 are inserted in the draw furnace 37 and sleeve 65 is heated and collapsed around the core cane segment 35. This forms a core-sleeve assembly 70. The temperature in the furnace 37 is preferably set between about 1700° C. and 2100° C. Preferably, prior to the step of collapsing, a purge gas, such as chlorine gas 75, is passed through a space 74 formed between the core cane segment 35 and the sleeve 65. The purge gas is provided at about 0.3 slpm for about 60–180 minutes at a temperature of between about 1000° C. and 1535° C. Alternatively, the step of collapsing to form the assembly 70 may be performed in a lathe (not shown) by passing a suitable heat source along the nested segment and sleeve while simultaneously rotating them.

Figure 15:
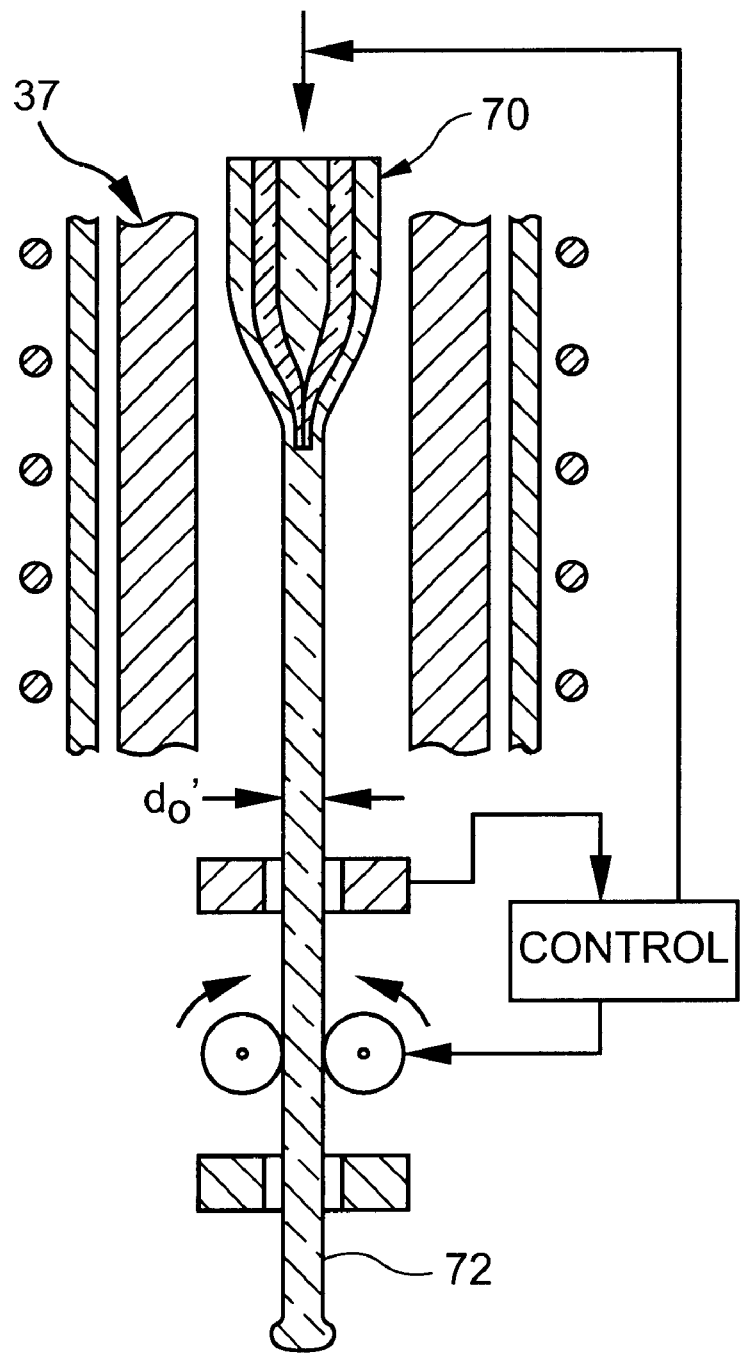
FIG. 15 illustrates a partially cross-sectioned side view of a core cane draw assembly for producing a multi-segment core cane in accordance with the present invention.

Next, as best shown in FIG. 15, after the step of collapsing, the core-sleeve assembly 70 is stretched in, for example, the draw furnace 37 to form a length of multi-segment cane 72. The length of cane 72 is drawn to a diameter dimension of $d_o'$ as shown in FIG. 15. Multi-segment core canes 76 are cut from the length 72. These segments 76 then have silica-containing cladding applied thereto to form on an outside cladding thereof.

Figure 16:
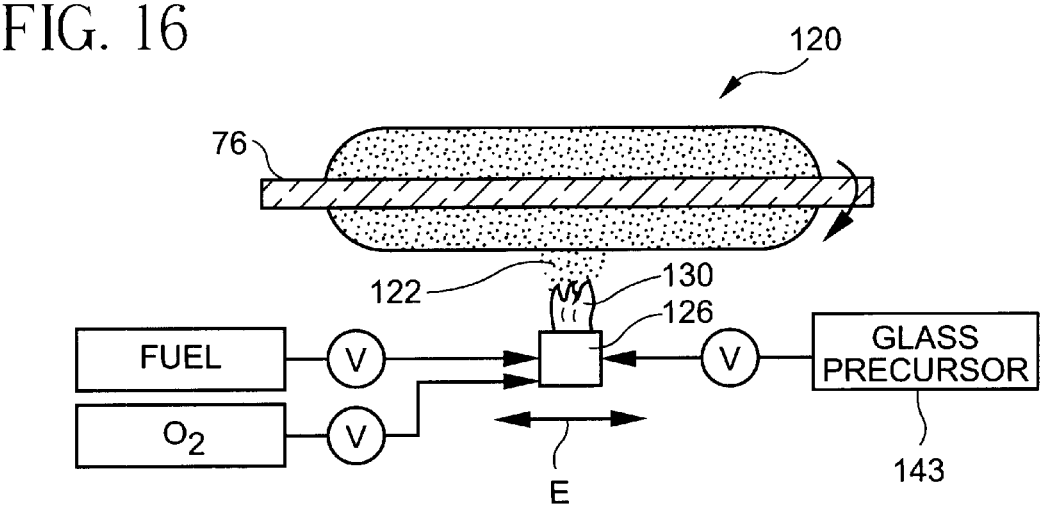
FIG. 16 illustrates a partially cross-sectioned view of an assembly for silica cladding the multi-segment core cane in accordance with an embodiment of the present invention.

In a preferred embodiment, silica-containing cladding soot 122 is applied to the outside of cane segment 76 in a conventional OVD process, as shown in FIG. 16. In the OVD process, a glass precursor 143, such as $SiCl_4$ or octamethylcyclotetrasiloxane, is provided in gaseous form to a burner 126. The burner flame 130 oxidizes the precursor 143 and forms silica-containing soot 122. This soot 122 is deposited onto the outside of the rotating length 76 by the traversing burner (as indicated by arrow E) to the appropriate predetermined thickness to form the overclad soot preform 120.

Figure 18:
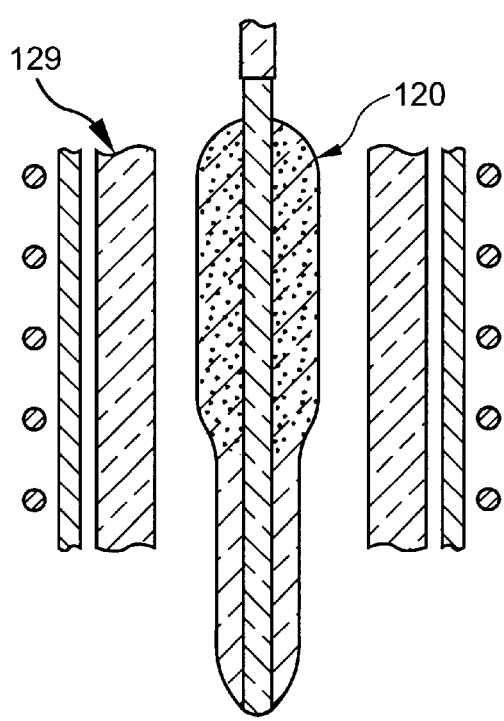
FIG. 18 illustrates a cross sectional view of the multi-segment soot preform being consolidated in accordance with an embodiment of the present invention.
Figure 19:
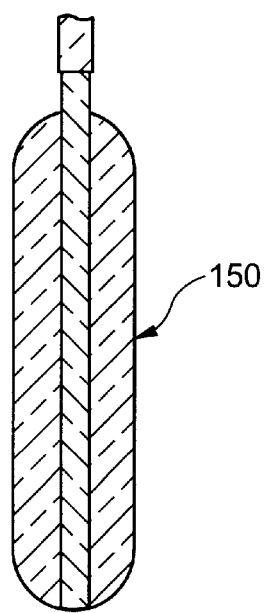
FIG. 19 illustrates a cross-sectional side view of the consolidated multi-segment preform in accordance with an embodiment of the present invention.

As best shown in FIG. 18, the soot-laden, multi-segment preform 120 is inserted in a consolidation furnace 129 and gradient sintered in a hot zone having a temperature of between about 950° C. and 1535° C. at a down drive speed of about 2–20 mm/minute, and most preferably about 5 mm/minute. The result is a consolidated multi-segment preform 150, as best shown in FIG. 19. A dopant, such as fluorine may be employed to down dope the cladding.

Figure 17:
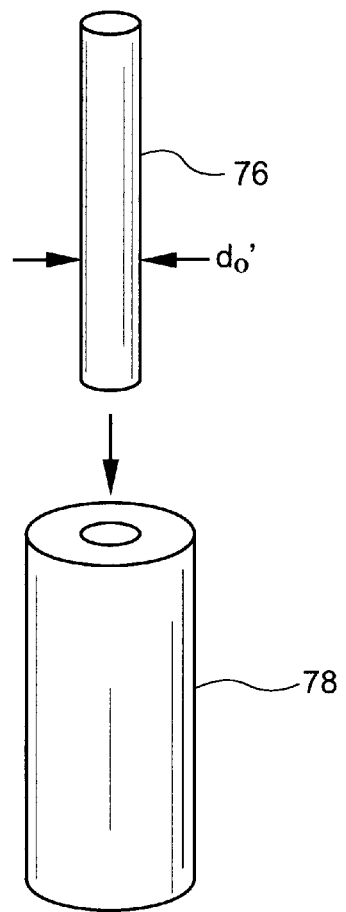
FIG. 17 illustrates a perspective view of the assembly of a length of the multi-segment core cane into a silica cladding tube in accordance with an embodiment of the present invention.
Figure 20:
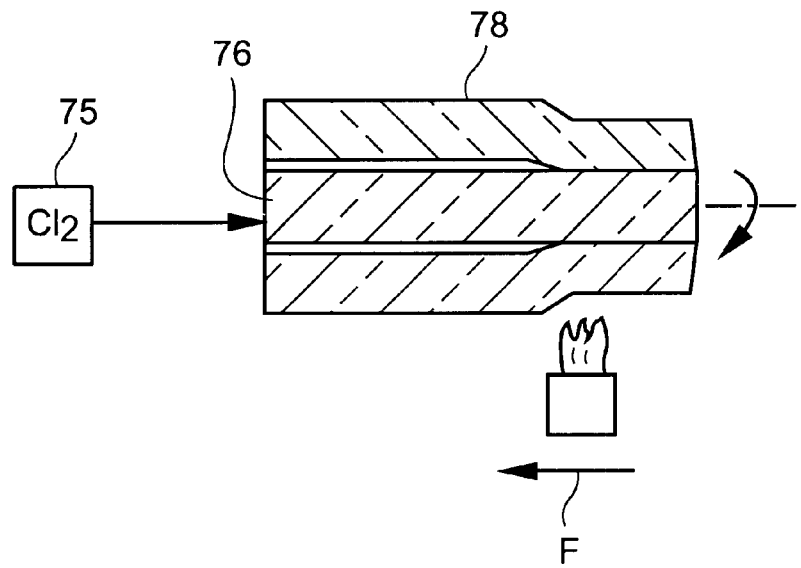
FIG. 20 illustrates a schematic partially cross-sectioned view of the step of collapsing a cladding tube onto the multi-segmented core cane preform in accordance with an embodiment of the present invention.
Figure 21:
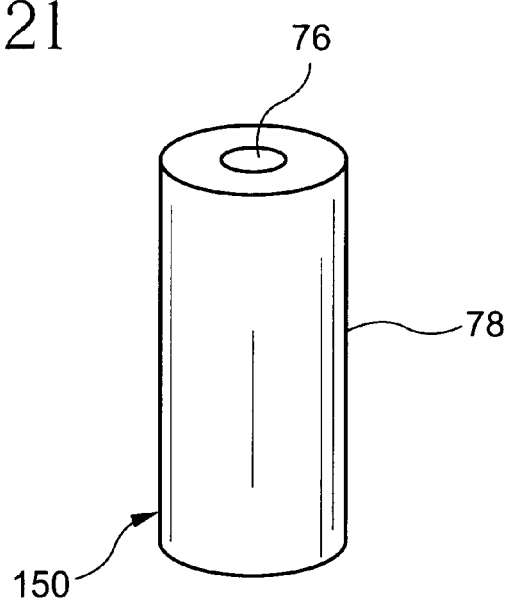
FIG. 21 illustrates a perspective view of an embodiment of the consolidated multi-segment preform in accordance with an embodiment of the present invention.

In an alternate method, as best shown in FIGS. 17 and 20–21, the length of multi-segment core cane 76 is inserted into a silica-containing glass cladding tube 78 (FIG. 17). Then, the cladding tube 78 is collapsed onto the multi-segment core cane 76. Preferably, this is accomplished in a suitable lathe apparatus (not shown for clarity). The cladding tube 78 and multi-segment core cane 76 are simultaneously rotated in the lathe and subjected to sufficient heat from a flame or other heat source traversing along the length as indicated by arrow F. A chlorine gas 75 may be provided to the gap between the cane 76 and tube 78 prior to the step of collapsing. The result is a multi-segment preform 150 including the multi-segment core cane 76 and silica-containing cladding tube 78 which is now ready for being transferred to a draw furnace to draw optical fiber therefrom. Optical fiber is drawn from the preform 150 in a conventional manner as was earlier described with respect to FIG. 8.

Figure 7:
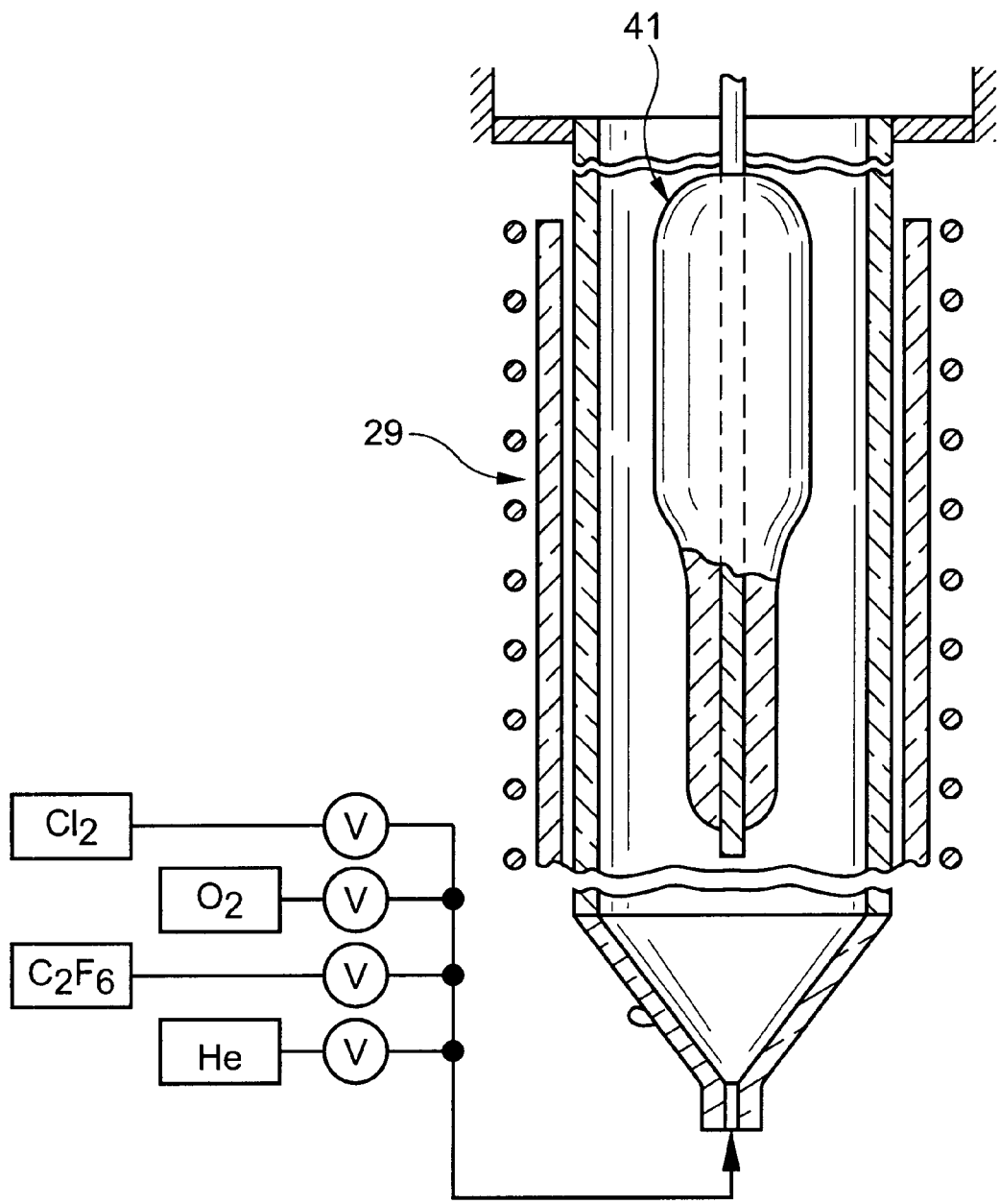
FIG. 7 illustrates a partially cross-sectioned side view of a preform in a consolidation furnace in accordance with the prior art.
Figure 22:
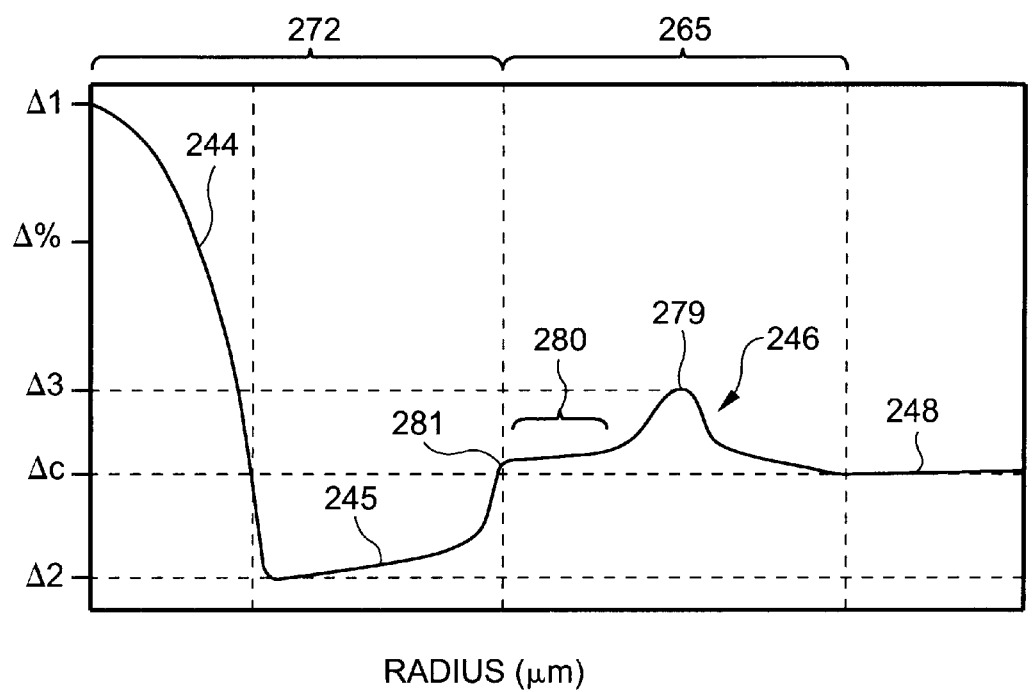
FIG. 22 illustrates a plot the refractive index profile of an embodiment of the consolidated multi-segment preform in accordance with an embodiment of the present invention.
Figure 23:
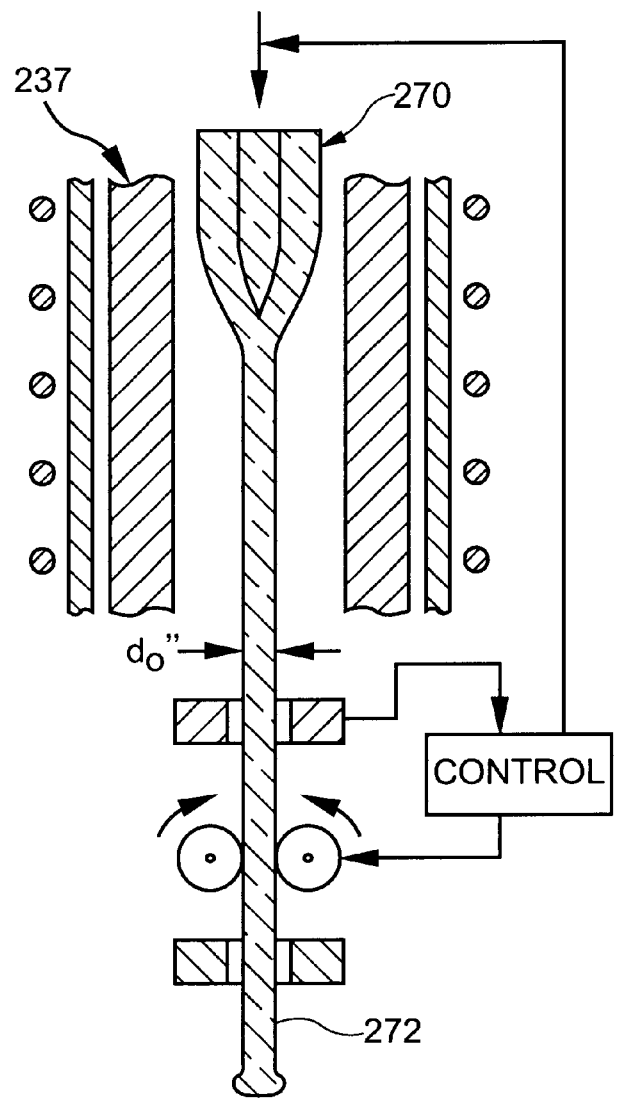
FIG. 23 illustrates a partially cross-sectioned side view of an apparatus for drawing the core cane blank into a core cane in accordance with an embodiment of the present invention.

According to another embodiment of the invention, a method manufacturing a multi-segment optical fiber preform is provided. As shown in FIG. 22, the method includes the steps of forming a core cane including a first up-doped portion and a down-doped portion, forming a sleeve on an inside of a tube including a second up-doped portion 246, inserting the core cane into the sleeve, and finally collapsing the sleeve around the core cane to form a cane-sleeve assembly. As is described in FIGS. 1–6, the first up-doped portion of the preform corresponding to the first segment 244 is formed by a conventional OVD method by forming a core soot region by depositing silica-containing soot onto an outside of a rotating deposition surface (FIG. 2), consolidating the core soot region in a consolidation furnace (FIGS. 3–4) thereby forming a consolidated core blank 31, and drawing from the consolidated core blank a first core cane segment 35. The step of forming the down-doped portion of the core cane corresponding to moat 245 of FIG. 22 in accordance with the invention comprises first forming a silica soot region by depositing silica-containing soot onto an outside of a first core cane segment 35 as is shown in FIG. 16. Next, the silica soot region is exposed to a down-dopant compound, such as $F_2$, $CF_4$, $SF_6$, $SiF_4$ or any other suitable down-dopant, such that the silica soot region becomes sufficiently down-doped for the particular fiber being produced. The exposure may take place in a consolidation furnace (FIG. 7) as is described in U.S. Pat. No. 4,629,485. Alternatively, the down-doping may be formed during deposition by providing a F-containing compound to a flame along with a silica glass precursor to form fluorinated soot. Generally, deltas of between about −0.1 and −0.8 are achievable by the OVD method. Next, the down-doped silica soot region is consolidated in a consolidation furnace thereby forming a consolidated core blank and is shown in FIG. 7. A core cane 272 including the up-doped segment 244 and down-doped segment 245 is then drawn from the consolidated core blank 270 in a draw apparatus 237. Thus, a cane 272 having a dimension do" is formed wherein do" is preferably in the range of between about 2 and 10 mm. The cane 272 makes up the segments 244 and 245 (FIG. 22).

Figure 24:
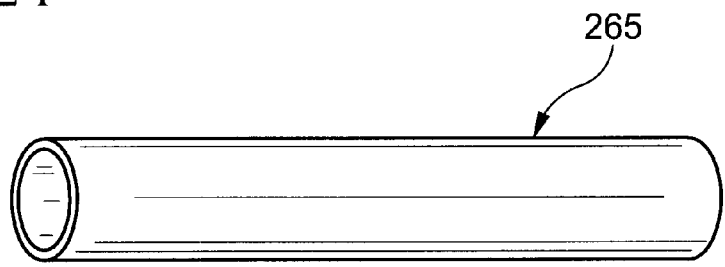
FIG. 24 illustrates a perspective view of an embodiment of a sleeve in accordance with an embodiment of the present invention.

Along with producing the core cane, the sleeve may be produced by a PCVD or MCVD method, as heretofore described with reference to FIGS. 11 and 13. However, in this embodiment, the hollow cylindrical sleeve 265 (FIG. 24) includes an up-doped portion corresponding to segment 246 formed on the innermost radial portion of the sleeve 265. The sleeve 265 is formed on the inside of the tube by providing an up-dopant compound, such as $GeCl_4$ and a silica precursor, such as $SiCl_4$ to the inside of the glass tube. The compound and precursor are suitably heated to form doped glass inside the tube. Preferably, the heating is accomplished by passing a microwave resonator over the tube to form a plasma inside of the tube as is described in FIG. 13 or by a flame as shown in FIG. 11. In accordance with a preferred embodiment, the second up-doped portion corresponding to up-doped segment 246 includes a raised portion 279 within the segment and a area of lower refractive index 280 leading smoothly up to the raised portion 279 wherein the raised portion 280 is spaced a distance from an outer edge 281 of the down-doped portion 245. By way of example, the raised portion is preferably located between about 1 mm and 5 mm from the edge 281.

Figure 25:
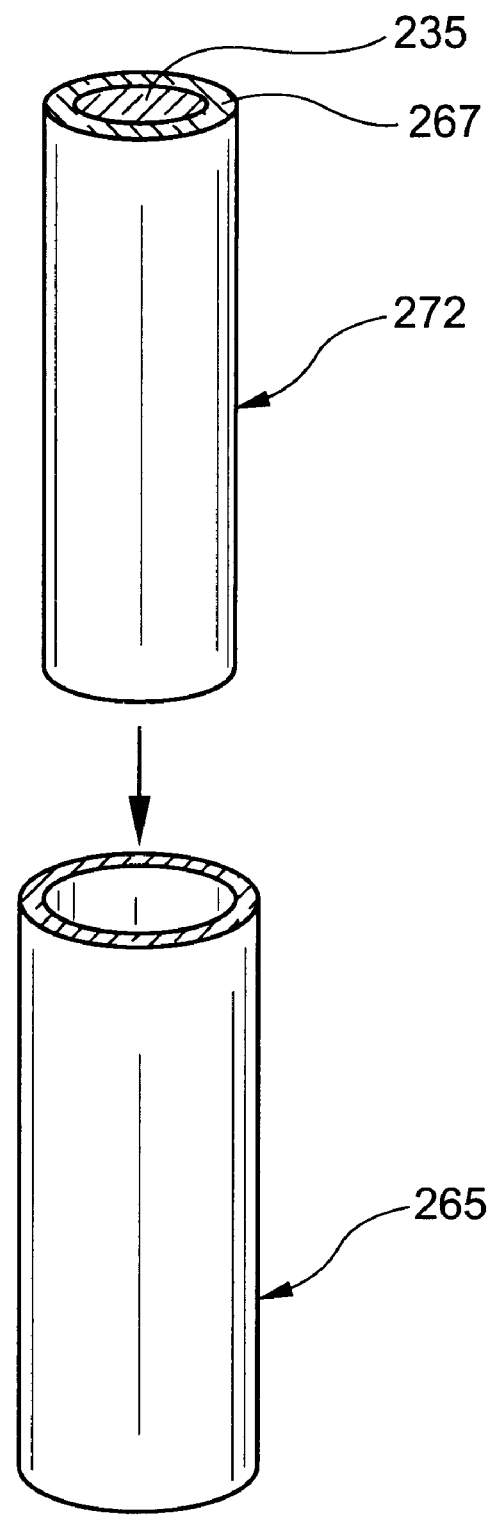
FIG. 25 illustrates a perspective view of the assembly of a length of the multi-segment core cane into a sleeve in accordance with an embodiment of the present invention.
Figure 26:
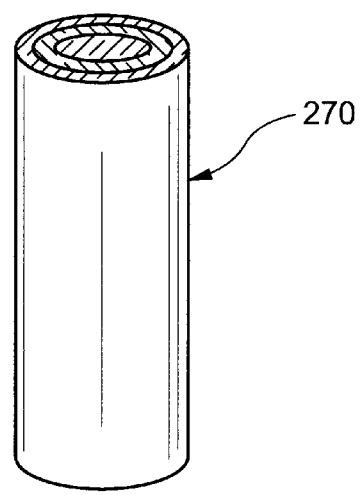
FIG. 26 illustrates a perspective view of an embodiment of cane-sleeve assembly in accordance with an embodiment of the present invention.
Figure 27:
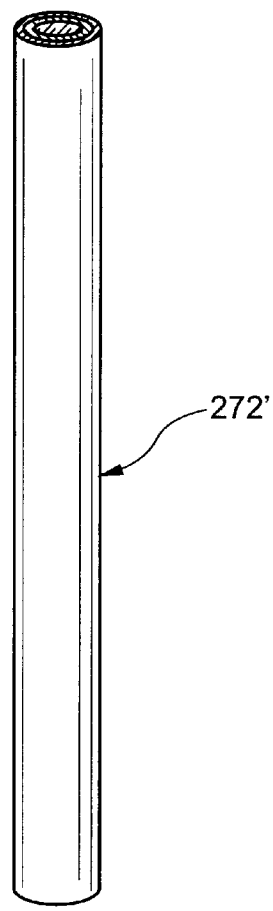
FIG. 27 illustrates a perspective view of an embodiment of a multi-segmented core cane in accordance with an embodiment of the present invention.

As was heretofore described, the cane 272 including the up-doped portion 235 and the down-doped portion 267 surrounding it is inserted in the sleeve 265 as shown in FIG. 25. The sleeve 265 is then collapsed onto the core cane 272 in a similar manner as is described with reference to FIG., 14b or optionally by the method described with reference to FIG. 20. The resultant preform 270 is then drawn in a draw furnace in accordance with the method described with reference to FIG. 15 into a final multi-segmented core cane 272' (FIG. 27). Additional cladding, corresponding to cladding segment 248 (FIG. 22), is then formed on the outside of the core cane 272' in accordance with the method described with reference to FIG. 16. The overclad preform is then consolidated to form the final multi-segmented preform. Alternatively, the core cane 272' may be inserted into a cladding tube, such as 78 (FIG. 17) and then collapsed as is described with reference to FIG. 20 to form the final preform.

Figure 8:
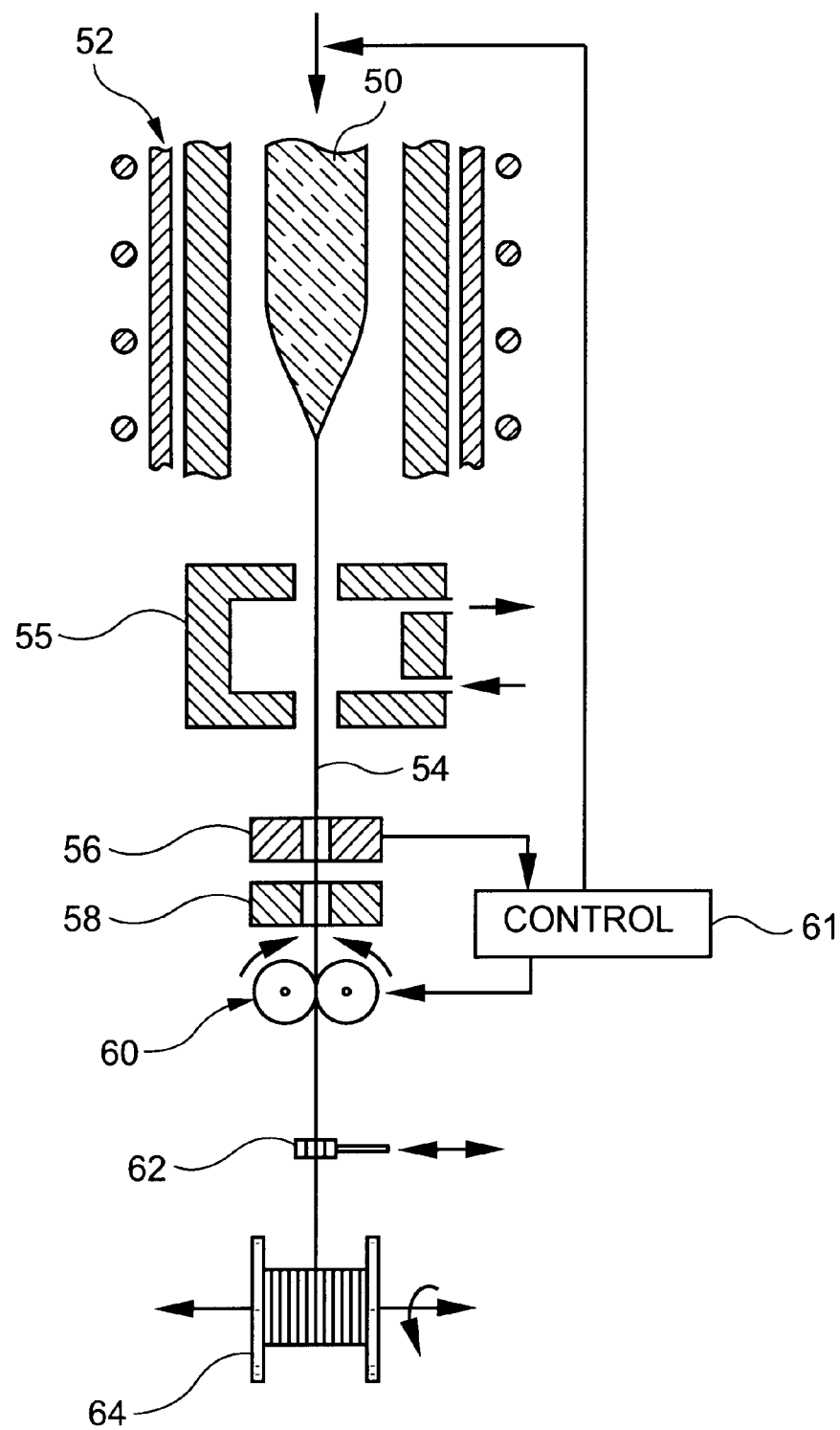
FIG. 8 illustrates a partial cross-sectioned side view of an optical fiber draw apparatus in accordance with the prior art.

Thus, it should be recognized that the method in accordance with this embodiment of the invention provides for manufacturing a multi-segment optical fiber preform by forming a core cane including a first up-doped portion and a down-doped portion by an OVD process, forming the sleeve including a second up-doped portion by one of a MCVD and PCVD process, inserting the core cane into the sleeve, and collapsing the sleeve around the core cane to form a cane-sleeve assembly. Next, the cane-sleeve assembly is stretched into a multi-segmented core cane. A cladding portion is then formed around the multi-segmented core cane to form an over-clad assembly, and consolidated to form the multi-segment optical fiber preform. The preform is then drawn into optical fiber in accordance with conventional methods as shown in FIG. 8, for example.

In addition to these embodiments, persons skilled in the art can see that numerous modifications and changes may be made to the above invention without departing from the intended scope thereof. For example, additional down-doped portions may be added radially outward from the up-doped ring portion, if desired, by simply adding additional layers in the PCVD or MCVD process, whichever is used. Likewise additional rings may be employed in a similar manner.

What is claimed is:

1. A method of manufacturing a multi-segment optical fiber preform, comprising the steps of:
   forming a cylindrically-shaped core soot region by an OVD method by depositing silica-containing soot onto an outside radial surface of a rotating mandrel,
   removing the mandrel,
   consolidating the core soot region in a consolidation furnace thereby forming a consolidated core blank,
   drawing from the consolidated core blank at least one core cane segment having an outer dimension $d_o$ wherein all portions of the at least one core cane are up-doped,
   forming a sleeve on an inside of a tube wherein the sleeve includes at least one down-doped radial portion on an inner radial portion of the sleeve and at least one radial up-doped portion on an outer radial portion of the sleeve,
   inserting the core cane segment into the sleeve, and
   collapsing the sleeve around the core cane segment to form a core-sleeve assembly.

2. The method of claim 1 further comprising an additional step of stretching being performed subsequent to step of collapsing wherein the core-sleeve assembly is stretched to form a multi-segment cane.

3. The method of claim 1 wherein the core cane segment further comprises a germania dopant.

4. The method of claim 3 wherein the core cane segment further comprises a delta of between 0.2% and 3%.

5. The method of claim 1 wherein the step of forming the sleeve further comprises providing a glass precursor and a dopant compound, both in gaseous form, to an inside cavity of the tube and heating the gases wherein doped-consolidated glass is formed inside the tube.

6. The method of claim 5 wherein the tube comprises silica-containing glass.

7. The method of claim 5 comprising an additional step of moving a resonator along a length of the tube and forming a plasma inside the tube.

8. The method of claim 5 comprising an additional step of moving a burner along a length of the tube.

9. The method of claim 1 wherein the step of drawing at least one core cane segment further comprises heating the core blank to between about 1700° C. and 1800° C. and drawing, under tension, a core cane length from which the at least one core cane segment is formed.

10. The method of claim 1 wherein the outer dimension ($d_o$) comprises a diameter between about 1 mm and 8 mm.

11. The method of claim 1 wherein prior to the step of inserting, the sleeve undergoes a step of shrinking to have an inner dimension ($d_i$) larger than the outer dimension ($d_o$) by between 0.5 mm and 2 mm.

12. The method of claim 11 wherein the step of shrinking further comprises forming the inner dimension ($d_i$) to have a diameter between about 2 mm and 10 mm.

13. The method of claim 1 wherein the up-doped portion of the sleeve includes germania.

14. The method of claim 13 wherein the at least one up-doped portion includes a delta between 0.1% and 1.2%.

15. The method of claim 1 wherein the down-doped portion of the sleeve includes fluorine.

16. The method of claim 15 wherein the down-doped portion includes a delta between −0.1% and −1.2%.

17. The method of claim 2 further comprising, prior to the step of collapsing, a step of passing a chlorine gas through a space formed between the core cane segment and the sleeve.

18. The method of claim 1 further comprising, prior to the step of inserting, a step of shrinking the sleeve to a diameter ($d_i$).

19. The method of claim 1 further comprising, subsequent to the step of collapsing, the steps of:
   depositing additional silica-containing soot onto a length of the multi-segment cane, and
   consolidating the soot-laden, multi-segment cane.

20. The method of claim 1 further comprising, subsequent to the step of collapsing, the steps of:
   inserting a length of the multi-segment cane into a silica cladding tube, and
   collapsing the silica cladding tube onto the at least one multi-segment cane.

21. A method of making an optical fiber preform, comprising the steps of:
   forming a core cane segment including a refractive index delta between 0.2% and 3% by an OVD method by depositing silica-containing soot onto an outside radial surface of a rotating mandrel, removing the mandrel, consolidating the silica-containing soot, and drawing the core cane segment therefrom, wherein all portions of the core cane segment are up-doped,
   forming a sleeve including a down-doped moat on an inner radial portion of the sleeve having a refractive index delta between −0.1% and −1.2% and an up-doped ring on an outer radial portion of the sleeve having a refractive index delta between 0.1% and 1.2%, the sleeve being formed by one of an MCVD and PCVD method, and
   inserting the core cane segment into the sleeve and collapsing the sleeve onto the core cane segment to form a core-sleeve assembly.

22. The method of claim 21 further comprising the additional steps of:
   drawing the core-sleeve assembly into a multi-segment core cane,
   inserting a length of the multi-segment core cane into a silica cladding tube, and
   collapsing the cladding tube onto the length of the multi-segment core cane.

23. The method of claim 21 further comprising the additional steps of:
   drawing the core-sleeve assembly into a multi-segment core cane,
   depositing additional silica-containing soot onto a length of the multi-segment core cane to form a soot-laden, multi-segment cane, and
   consolidating the soot-laden, multi-segment cane to form the preform.

24. A method of making a multi-segment optical fiber preform, comprising the steps of:
   forming a core cane including a refractive index increasing dopant by an OVD process by depositing silica-containing soot onto an outside radial surface of a mandrel, removing the mandrel, consolidating the silica-containing soot, and drawing the core cane therefrom, wherein all portions of the core cane are up-doped,
   forming a sleeve including a refractive index decreasing dopant in a inner radial portion thereof and a refractive index increasing dopant in a outer radial portion thereof, the sleeve being formed by one selected from a group consisting of an MCVD and a PCVD process, inserting the core cane into the sleeve and collapsing the sleeve onto the core cane to form a core-sleeve assembly, drawing the core-sleeve assembly into a multi-segment core cane having a smaller diameter than the core-sleeve assembly, and forming a cladding on an outside of the multi-segment core cane.

25. A method of making a multi-segmented optical fiber preform, comprising the steps of:

forming a core cane by an ODV method by depositing silica-containing soot onto an outside radial surface of a mandrel, removing the mandrel, consolidating the silica-containing soot and drawing the core cane segment therefrom, wherein all portions of the core cane are up-doped, forming a sleeve including a refractive index decreasing dopant in a inner radial portion thereof and a refractive index increasing dopant in a outer radial portion thereof, the sleeve being formed by introducing a glass precursor and dopant compounds into a cavity of a tube to form consolidated doped glass, inserting the core cane into the sleeve and collapsing the sleeve onto the core cane to form a core-sleeve assembly, drawing the core-sleeve assembly into a multi-segment core cane having a smaller diameter than the core-sleeve assembly, and forming a cladding on an outside of the multi-segment core cane.

26. A method of manufacturing a multi-segment optical fiber, comprising the steps of:

forming a cylindrically-shaped core soot preform by depositing silica-containing soot onto an outside radial surface of a mandrel by an OVD method, removing the mandrel, consolidating the core soot preform in a consolidation furnace thereby forming a consolidated core blank, drawing from the consolidated core blank at least one core cane segment wherein all portions of the at least one core cane are up-doped, forming a sleeve on an inside of a tube wherein the sleeve includes a down-doped radial portion on an inner radial portion of the sleeve and a up-doped radial portion on an outer radial portion of the sleeve as compared to silica, inserting the core cane segment into the sleeve, collapsing the sleeve around the core cane segment to form a core-sleeve assembly, stretching the core-sleeve assembly to form a multi-segment core cane having a smaller diameter than the core-sleeve assembly, forming a cladding on an outside of the multi-segment core cane to form an final optical fiber preform, and drawing the optical fiber from the final optical fiber preform.

* * * * *